US012332676B2

(12) United States Patent
Wang et al.

(10) Patent No.: US 12,332,676 B2
(45) Date of Patent: Jun. 17, 2025

(54) ONE-SHOT CIRCUIT WITH CURRENT COMPENSATION

(71) Applicant: TEXAS INSTRUMENTS INCORPORATED, Dallas, TX (US)

(72) Inventors: Yutao Wang, Rizhao (CN); Liang Zhang, Beijing (CN); Xinyu Yin, Beijing (CN); Pengyu Guo, Beijing (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 237 days.

(21) Appl. No.: 18/312,562

(22) Filed: May 4, 2023

(65) Prior Publication Data

US 2024/0370047 A1 Nov. 7, 2024

(51) Int. Cl.
*G05F 1/59* (2006.01)

(52) U.S. Cl.
CPC .................................... *G05F 1/59* (2013.01)

(58) Field of Classification Search
CPC ........................................................ G05F 1/59
USPC ........................................................ 327/540
See application file for complete search history.

(56) References Cited

U.S. PATENT DOCUMENTS 7,005,838 B2 * 2/2006 Tobita .................. H02M 3/073 327/540
11,099,591 B1 * 8/2021 Köse ......................... G05F 1/59
2023/0120432 A1 * 4/2023 Womac ............... H02M 3/1588 323/282

OTHER PUBLICATIONS

Wikipedia, the Free Encyclopedia; "Buck Converter"; https://en.wikipedia.org/wiki/Buck_converter; Mar. 10, 2023; 16 pgs.
John Lee; "Basic Calculation of a Buck Converter's Power Stage"; Richtek your power partner—Application Note—AN041; Dec. 2015; 9 pgs.
Technical Note 10637; "Switching Regulator Inductor Selection"; Eaton Powering Business Worldwide; Effective Dec. 2016; 3 pgs.
Jing Wang; "Control of Current Ripple in DC-DC Converters"; Thesis; The University of British Columbia; Nov. 1996; 198 pgs.
"Ripple Current and Its Effects on the Performance of Capacitors"; Newsletter; Mar. 10, 2023; 9 pgs; https://passive-components.eu/ripple-current-and-its-effects-on-the-performance-of-capacitors/.

(Continued)

*Primary Examiner* — Tomi Skibinski
(74) *Attorney, Agent, or Firm* — Valerie M. Davis; Frank D. Cimino

(57) ABSTRACT

A circuit includes a current compensation circuit having first and second compensation inputs, and a compensation output. The first compensation input is coupled to an input voltage terminal and the second compensation input is coupled to a switching terminal. The circuit further includes a one-shot circuit having a comparator having first and second comparator inputs, and a comparator output. The first comparator input is coupled to a voltage reference terminal and the second comparator input is coupled to the compensation output. The one-shot circuit further includes a switch coupled between the second comparator input and a ground terminal and a capacitor having first and second capacitor terminals, in which the first capacitor terminal is coupled to the second comparator input and the second capacitor terminal is coupled to the ground terminal.

22 Claims, 5 Drawing Sheets

(56) References Cited

OTHER PUBLICATIONS

"Ripple Current and Its Effects on the Performance of Capacitors"; doEEEt Blog; Mar. 10, 2023; 14 pgs; https://passive-components.eu/ripple-current-and-its-effects-on-the-performance-of-capacitors/.
Charles Coles; "How to Control Input Ripple and Noise in Buck Converters"; EE|Times; Advanced Analogic Technologies; Feb. 4, 2007; https://www.eetimes.com/designline/power-management-designline.
Article; "Capacitor Ripple Current, Transient and Surge Power Load Ratings"; Jan. 17, 2023; retrieved Mar. 10, 2023; 7 pgs.; https://passive-components.eu/capacitor-ripple-current-transient-and-power-load-rating-explained/.
Anushree Ramanath; "What is a DC-DC Convertger and How Does it Work?" Technical Article Jun. 21, 2022; retrieved Mar. 10, 2023; 4 pgs. https://eepower.com/technical-articles/what-is-a-dc-dc-converter-and-how-does-it-work/#.
Publication; "TPSM82903, 3-A, 3-v to 17-V, High Efficiency and Low IQ Buck Converter Module in a Microsip(TM) Package With an Integrated Inductor"; Revised Nov. 2022; 41 pgs.

* cited by examiner

ONE-SHOT CIRCUIT WITH CURRENT COMPENSATION

TECHNICAL FIELD

This description relates to electrical circuits, in particular, to circuits and systems implementing a one-shot circuit with current compensation.

BACKGROUND

Power electronic systems are used in numerous devices. For example, portable electronic devices such as cellphones and laptops include a power electronic component called the converter that converts an input power level to an output power level based on a power requirement for a sub-circuit of the portable electronic device. Due to the vast number of sub-circuits that are present in these complex devices, there is a need to cater to varied voltage requirements that are not the same as the battery or the AC supply that powers the device.

In many electronic devices, the DC current signal applied to a circuit can have a residual AC portion. The AC portion is referred to as the ripple current. The ripple current can lead to increased heating and power dissipation in electronic components. Accordingly, efforts are made to keep ripple current low.

SUMMARY

An example circuit includes a current compensation circuit having first and second compensation inputs, and a compensation output, in which the first compensation input is coupled to an input voltage terminal and the second compensation input is coupled to a switching terminal. The circuit further includes a one-shot circuit including a comparator having first and second comparator inputs, and a comparator output, in which the first comparator input is coupled to a voltage reference terminal and the second comparator input is coupled to the compensation output. The one-shot circuit further includes a switch coupled between the second comparator input and a ground terminal. The one-shot circuit also includes a capacitor coupled between the second comparator input and the ground terminal.

Another example circuit includes a current compensation circuit configured to provide a compensated current based on a first voltage and a second voltage, wherein the first voltage is proportional to an input voltage and the second voltage is proportional to an average value of a switching voltage. The circuit further includes a one-shot circuit including a capacitor configured to provide a capacitor voltage based on the compensated current, a comparator configured to provide a comparator signal based on the capacitor voltage and a reference voltage, and a switch configured to discharge the capacitor.

As another example, a system including a converter that includes a high-side switch having first and second high-side terminals, in which the first high-side terminal is coupled to an input voltage terminal and the second high-side terminal is coupled to a switching terminal. The converter further includes a low-side switch having first and second low-side terminals, in which the first low-side terminal is coupled to the switching terminal and the second low-side terminal is coupled to a ground terminal, and an inductor having first and second inductor terminals, in which the first inductor terminal is coupled to the switching terminal and the second inductor terminal is coupled to an output terminal. The system further includes a current compensation circuit having first and second compensation inputs, and a compensation output, in which the first compensation input is coupled to the input voltage terminal and the second compensation input is coupled to the switching terminal. Furthermore, the system includes a one-shot circuit including a comparator having first and second comparator inputs, and a comparator output, in which the first comparator input is coupled to a voltage reference terminal and the second comparator input is coupled to the compensation output. The one-shot circuit further includes a switch coupled between the second comparator input and the ground terminal; and a capacitor having first and second capacitor terminals, in which the first capacitor terminal is coupled to the second comparator input and the second capacitor terminal is coupled to the ground terminal.

DETAILED DESCRIPTION

This description relates to circuits and systems that implement a one-shot circuit with current compensation, such as can be implemented in power converter modules to provide constant inductor current ripple.

Power converter circuits employ high-frequency power conversion using switches and other passive components like inductors and capacitors to get a desired output voltage. With the need to meet the rapidly shrinking product footprints, power electronic systems are using higher and higher switching frequencies, to take advantage of smaller inductors and capacitors. However, using smaller inductors and capacitors leads to increased input ripple current and noise. For example, the power converter circuits are implemented as power converter modules, for example, DC-DC modules, to be utilized as part of compact electronic devices. In such modules, the value of the inductor is fixed. In other words, the value of the inductor cannot be varied in accordance with the output voltage to be generated. As a result, when the output voltage increases, the inductor ripple current increases. However, the inductor ripple current values have to be limited to meet the system requirements, and as a result only low values of output voltage can be supported by the power converter modules, thereby limiting their performance.

In an example, a circuit includes a current compensation circuit and a one-shot circuit. The one-shot circuit includes a capacitor and a comparator. The comparator is configured to provide an output signal to turn off a high-side switch of the power converter circuit. The current compensation circuit is configured to provide a compensated current, which is proportional to a difference between an input voltage and output voltage of a power converter circuit. The compensated current charges the capacitor of the one-shot circuit and the comparator is configured to turn off the high-side switch of the power converter circuit responsive to the voltage across the capacitor reaching a reference voltage.

Therefore, the output of the comparator of the one-shot circuit controls an on-time of the high-side switch of the power converter circuit. The on-time of the high-side switch refers to a continuous time period during which the high-side switch is ON. Controlling the on-time of the high-side switch of the power converter circuit based on constant values of the one-shot circuit, as described below, helps to achieve a constant inductor ripple current in the power converter circuit. As a result, the circuit (e.g., a system on chip (SOC) module), which includes the current compensation circuit and the one-shot circuit, can provide higher output voltages without increasing the inductor ripple current.

Figure 1:
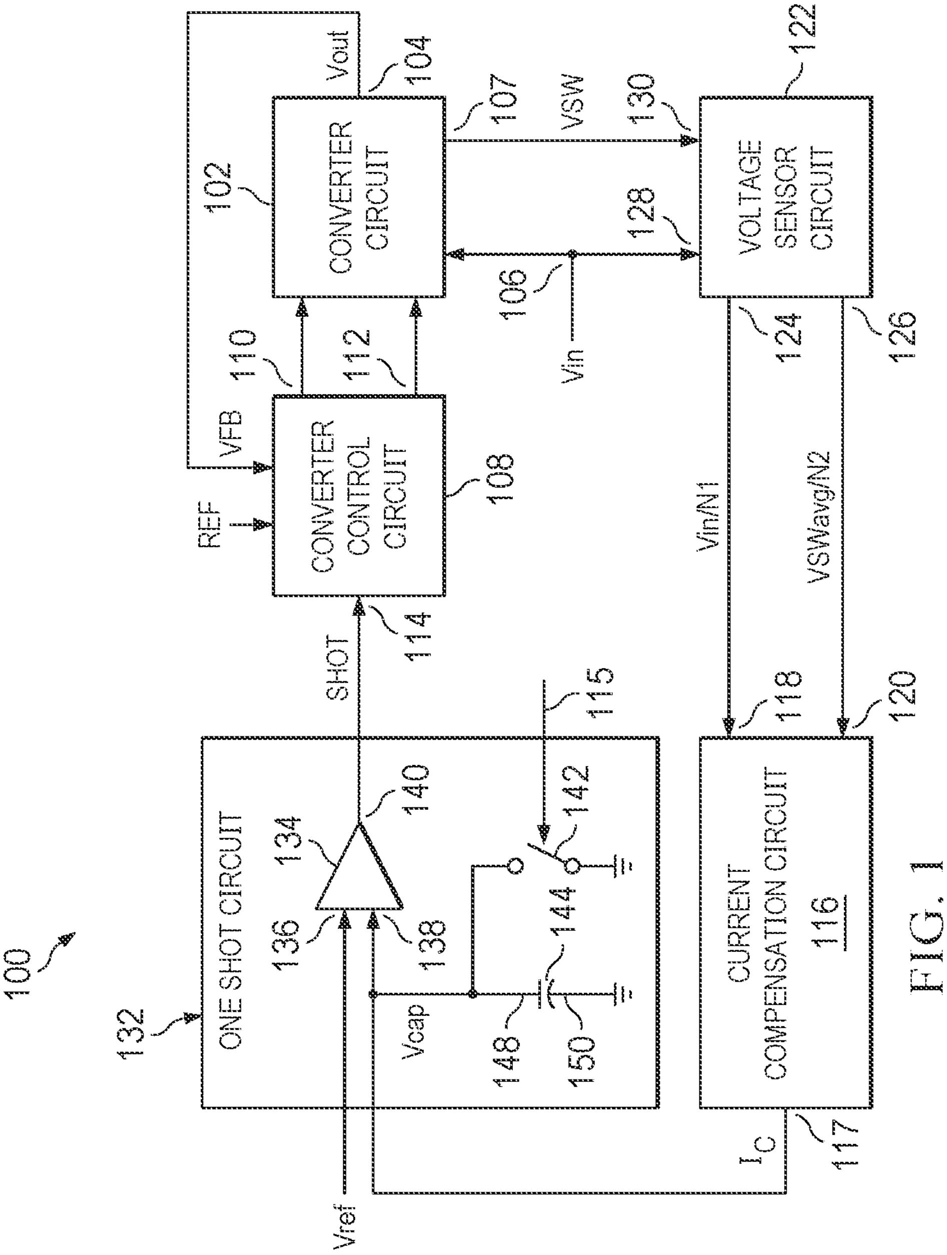
FIG. 1 illustrates a block diagram of an example circuit.

FIG. 1 illustrates a block diagram of an example circuit 100. In some examples, the circuit 100 is implemented in a power converter integrated circuit (IC) or SOC module, such as a DC-DC module. The circuit 100 includes a converter circuit 102 having an output terminal 104, and the converter circuit 102 is configured to provide an output voltage Vout at 104 based on an input voltage Vin at an input voltage terminal 106. In some examples, the converter circuit 102 is implemented as a DC-DC converter circuit like a buck converter, boost converter etc. However, the converter circuit 102 may be implemented differently in other examples. The circuit 100 further includes a converter control circuit 108 having a first driver output terminal 110 and a second driver output terminal 112. The converter control circuit 108 is configured to provide a high-side driving signal at the first driver output terminal 110 and a low-side driving signal at the second driver output terminal 112. The converter control circuit 108 is configured to provide the high-side driving signal to drive a high-side switch (not shown in FIG. 1) of the converter circuit 102 and the low-side driving signal to drive a low-side switch (not shown in FIG. 1) of the converter circuit 102. The high-side driving signal and the low-side driving signal thus control the switching of the high-side switch and the low-side switch of the converter circuit 102, respectively.

The converter control circuit 108 is configured to generate the high-side driving signal and the low-side driving signal based on a feedback voltage VFB (e.g., via a feedback loop) and an output voltage reference signal REF. In particular, the converter control circuit 108 is configured to compare the feedback voltage VFB and the output voltage reference signal REF, in order to generate the high-side driving signal and the low-side driving signal. The feedback voltage VFB is derived based on the output voltage Vout at 104. In some examples, the feedback voltage VFB is equal to the output voltage Vout. However, in other examples, the feedback voltage VFB may be different from the output voltage Vout. For example, the feedback voltage VFB may include a voltage divided version of the output voltage that is proportional to Vout. The converter control circuit 108 also has an input 114 to receive a one shot signal, shown as SHOT. The converter control circuit 108 is configured to control/adjust an on-time Ton of the high-side switch of the converter circuit 102 based on the signal SHOT. For example, the converter control circuit 108 can vary the high-side driving signal and low-side driving signal in accordance with the shot signal SHOT, and thereby control the on-time Ton of the high-side switch of the converter circuit 102.

The circuit 100 further includes a one-shot circuit 132 having an output coupled to the input 114 of the converter control circuit 108. The one-shot circuit 132 is configured to generate the shot signal SHOT. The one-shot circuit 132 includes a comparator 134 that includes a first comparator input 136, a second comparator input 138 and a comparator output 140. The comparator output 140 corresponds to the output of the one short circuit 132, which is coupled to the input 114 of the converter control circuit 108. The first comparator input 136 is coupled to a voltage reference terminal and the second comparator input 138 is coupled to a compensation output 117 of a current compensation circuit 116. The one-shot circuit 132 further includes a switch 142 coupled between the second comparator input 138 and a ground terminal. The switch 142 can be implemented as a semiconductor or other type of switching device, such as a transistor (e.g., field effect transistor (FET), bipolar junction transistor (BJT)), a thyristor or the like. The one-shot circuit 132 further includes a capacitor 144 having a first capacitor terminal 148 and a second capacitor terminal 150, in which the first capacitor terminal 148 is coupled to the second comparator input 138 and the second capacitor terminal 150 is coupled to a ground terminal.

The capacitor 144 is configured to provide a capacitor voltage Vcap based on a compensated current $I_C$. In particular, the capacitor 144 is charged based on the compensated current $I_C$, thereby providing the capacitor voltage Vcap at the first capacitor terminal 148 and at the second comparator input 138. The comparator 134 is configured to provide a comparator signal (e.g., the shot signal SHOT) at the comparator output 140 based on the capacitor voltage Vcap at the second comparator input 138 and a reference voltage Vref at the first comparator input 136. The terms comparator signal and the shot signal SHOT are used interchangeably throughout the description and are construed to be the same. The comparator signal changes states (e.g., polarity) based on a comparison of the capacitor voltage Vcap at the second comparator input 138 and a reference voltage Vref at the first comparator input 136. The comparator signal has a first value/polarity responsive to the capacitor voltage Vcap becoming greater than the reference voltage Vref, and the comparator signal has a second value/polarity responsive to the capacitor voltage Vcap becoming lesser than the reference voltage Vref. The switch 142 is turned on when the comparator signal (e.g., the shot signal SHOT) has the first value/polarity. The switch 142 is configured to discharge the capacitor 144 when the switch 142 is turned on. The turning on and turning off of the switch 142 may be controlled by providing a switching signal 115.

The current compensation circuit 116 includes a first compensation input 118, a second compensation input 120 and a compensation output 117. The first compensation input 118 is coupled to the input voltage terminal 106 of the converter circuit 102 via a voltage sensor circuit 122. The second compensation input 120 is coupled to a switching terminal 107 of the converter circuit 102 via the voltage sensor circuit 122. The current compensation circuit 116 is configured to provide the compensated current $I_C$ based on the input signals received at 118 and 120.

The voltage sensor circuit 122 includes a first sensor input 128 and a first sensor output 124, in which the first sensor input 128 is coupled to the input voltage terminal 106 and the first sensor output 124 is coupled to the first compensation input 118. The voltage sensor circuit 122 further includes a second sensor input 130 and a second sensor output 126, in which the second sensor input 130 is coupled to the switching terminal 107 and the second sensor output 126 is coupled to the second compensation input 120. The voltage sensor circuit 122 is configured to provide a first voltage at the first sensor output 124 based on the input voltage Vin at the input voltage terminal 106. The first voltage at 124 is proportional to the input voltage Vin (e.g., Vin/N1, where N1 is a positive value, such as an integer or fractional value). The voltage sensor circuit 122 is also configured to provide a second voltage at the second sensor output 126 based on a switching voltage VSW at the switching terminal 107. The second voltage at 126 is proportional to an average switching voltage VSWavg that constitutes an average value of the switching voltage VSW at 107 (e.g., VSWavg/N2, where N2 is a positive value, such as an integer or fractional value). The values of N1 and N2 can be the same or different. The average switching voltage VSWavg can be equal to the output voltage Vout, and the second voltage at the second sensor output 126 can be proportional to the output voltage Vout. In some examples, the voltage sensor circuit 122 includes a first voltage divider circuit and a second voltage divider circuit configured to provide the respective signals/voltages at 124 and 126.

The current compensation circuit 116 is configured to provide the compensated current $I_C$ based on the first voltage Vin/N1 at the first compensation input 118 and the second voltage VSWavg/N2 at the second compensation input 120. For example, the compensated current $I_C$ is proportional to a difference between the input voltage Vin and the output voltage Vout. In some examples, the circuit 100 may be implemented as a system-on-chip (SOC) device in a packaging material.

Figure 2:
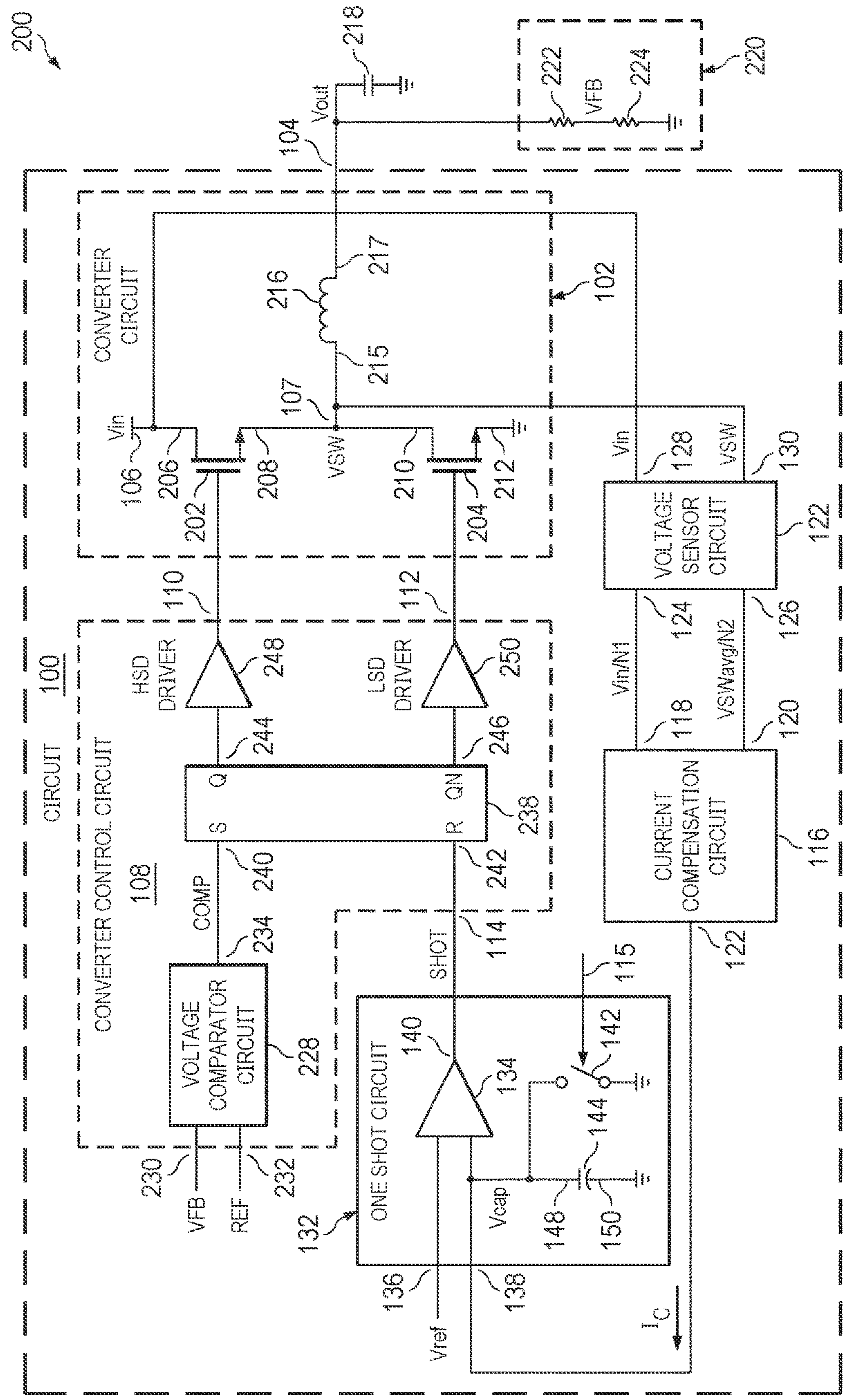
FIG. 2 is an example system that includes the circuit of FIG. 1.

FIG. 2 is a system 200 that includes the circuit 100 of FIG. 1. The system 200 provides a useful example of the converter circuit 102 and the converter control circuit 108 shown in FIG. 1. Accordingly, the description of FIG. 2 also refers to FIG. 1. In some examples, the circuit 100 is implemented as a semiconductor device (e.g., an SOC device) in a packaging material. In other examples, additional parts of the system 200 can be included in the SOC device.

The circuit 100 includes a converter circuit 102 that includes an output terminal 104 and an input voltage terminal 106. In the example of FIG. 2, the converter circuit 102 is implemented as a DC-DC buck converter. However, in other examples, the converter circuit 102 may be implemented differently. The converter circuit 102 includes a high-side switch 202 having a first high-side terminal 206 and a second high-side terminal 208, in which the first high-side terminal 206 is coupled to the input voltage terminal 106 and the second high-side terminal 208 is coupled to a switching terminal 107. The converter circuit 102 further includes a low-side switch 204 having a first low-side terminal 210 and a second low-side terminal 212, in which the first low-side terminal 210 is coupled to the switching terminal 107 and the second low-side terminal 212 is coupled to a ground terminal. In the example of FIG. 2, the high-side switch 202 and the low-side switch 204 are implemented as FETs. In other examples, the high-side switch 202 and the low-side switch 204 can be implemented as another type of switching device, such as a BJT, a thyristor or the like.

The converter circuit 102 is configured to provide a switching voltage VSW at the switching terminal 107 between the high-side switch 202 and the low-side switch 204 based on an input voltage Vin at the input voltage terminal 106. The converter circuit 102 further includes an inductor 216 coupled between the switching terminal 107 and the output terminal 104. The inductor 216 includes a first inductor terminal 215 and a second inductor terminal 217. The first inductor terminal 215 is coupled to the switching terminal 107 and the second inductor terminal 217 is coupled to the output terminal 104.

The system 200 further includes an output capacitor 218 coupled between the output terminal 104 and a ground terminal. In some examples, the output capacitor 218 constitutes a part of the buck converter included within the converter circuit 102. In addition, the system 200 includes a voltage divider circuit 220 configured to generate a feedback voltage VFB based on the output voltage Vout. The voltage divider circuit 220 includes a first resistor 222 and a second resistor 224 coupled in series to one another between the output terminal 104 and the ground terminal. The first resistor 222 is coupled between the output terminal 104 and the second resistor 224. The second resistor 225 is coupled between the first resistor 222 and a ground terminal.

The circuit 100 further includes a converter control circuit 108 having a first driver output terminal 110 and a second driver output terminal 112. The converter control circuit 108 is configured to provide a high-side driving signal at the first driver output terminal 110 to drive the high-side switch 202 of the converter circuit 102. The converter control circuit 108 is further configured to provide a low-side driving signal at the second driver output terminal 112 to drive the low-side switch 204 of the converter circuit 102. The converter circuit 102 is configured to provide an output voltage Vout at the output terminal 104 based on the input voltage Vin at an input voltage terminal 106, the high-side driving signal and the low-side driving signal.

The converter control circuit 108 is configured to provide the high-side driving signal at the first driver output terminal 110 and the low-side driving signal at the second driver output terminal 112, based on a comparator output signal COMP and a shot signal SHOT at 114. The converter control circuit 108 in FIG. 2 includes a voltage comparator circuit 228 having a first voltage comparator input 230 and a second voltage comparator input 232, and a voltage comparator output 234. The first voltage comparator input 230 is coupled to the output terminal 104. In the example of FIG. 2, the first voltage comparator input 230 is coupled to the output terminal 104 through the voltage divider circuit 220 to receive the feedback voltage VFB at the juncture between resistors 222 and 224. The second voltage comparator input 232 is coupled to an output voltage reference terminal that provides an output voltage reference signal REF. The voltage comparator circuit 230 is further configured to compare the feedback voltage VFB and the output voltage reference signal REF to generate the comparator output signal COMP at the voltage comparator output 234. The circuit 100 further includes a one-shot circuit 132 to provide the shot signal SHOT. The one-shot circuit 132 in FIG. 2 has the same structure of the one-shot circuit 132 in FIG. 1 and therefore the explanations are not repeated herein.

The converter control circuit 108 in FIG. 2 further includes a logic circuit 238 including a first logic input 240 and a second logic input 242, and a first logic output 244 and a second logic output 246. In some examples, the logic circuit 238 is implemented as an S-R flip flop. The first logic input 240 is coupled to the voltage comparator output 234 that provides the comparator output signal COMP. The second logic input 242 is coupled to a comparator output 140 of the one-shot circuit 132, which is configured to provide the shot signal SHOT. The second logic input 242 may be equivalent to or coupled to the input 114 of the converter control circuit 108. The logic circuit 238 is configured to provide a first driver signal at the first logic output 244 and is configured to provide a second driver signal at the second logic output 246 based on the comparator output signal COMP and the shot signal SHOT. The first logic output 244 is coupled to an input of a high-side driver circuit 248 and the second logic output 246 is coupled to an input of a low-side driver circuit 250. The high-side driver circuit 248 is configured to provide the high-side driving signal at the first driver output terminal 110 based on the first driver signal provided at 244. The low-side driver circuit 250 is configured to provide the low-side driving signal at the second driver output terminal 112 based on the second driver signal provided at 246. The high-side driving signal and the low-side driving signal are configured to control the switching of the high-side switch 202 and the low-side switch 204, respectively, of the converter circuit 102. In some examples, when the high-side driving signal is high, the low-side driving signal is low and vice-versa (e.g., the low-side driving signal is an inverted version of the high-side driving signal).

The one-shot circuit 132 is configured to generate the shot signal SHOT based on the reference voltage Vref at the first comparator input 136 and the capacitor voltage Vcap at the second comparator input 138. The logic circuit 238 is configured to control/adjust an on-time Ton of the high-side switch 202 based on the signal SHOT, as described herein. The circuit 100 further includes a current compensation circuit 116 to provide a compensated current $I_C$. In addition, the circuit 100 includes a voltage sensor circuit 122.

Figure 3:
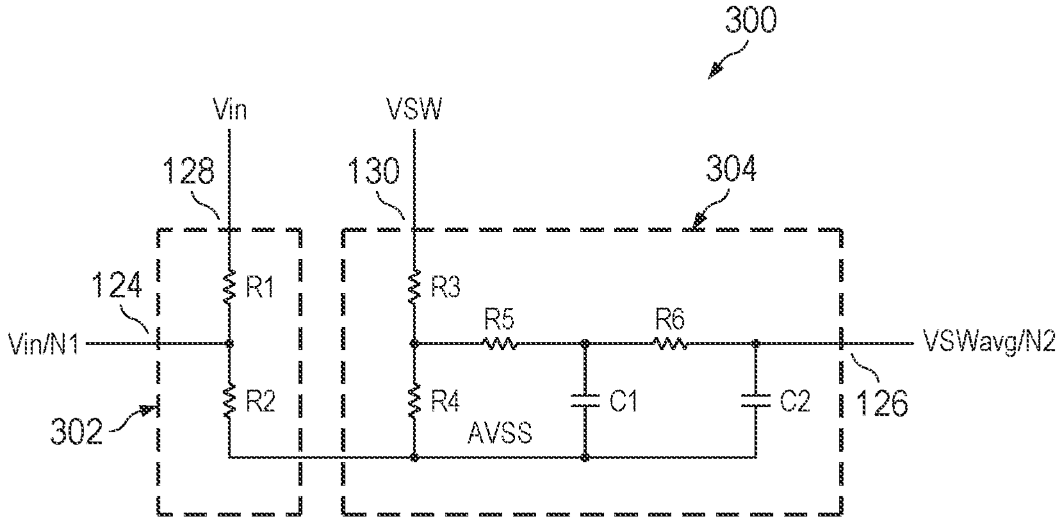
FIG. 3 illustrates an example voltage sensor circuit.

FIG. 3 illustrates an example voltage sensor circuit 300. The voltage sensor circuit 300 is a useful example of the voltage sensor circuit 122 in FIGS. 1 and 2. Accordingly, the description of FIG. 3 also refers to FIGS. 1 and 2. The voltage sensor circuit 300 includes a first voltage sensor circuit 302 including a first sensor input 128 and a first sensor output 124. The first voltage sensor circuit 302 includes a first voltage divider circuit including a resistor R1 and a resistor R2 coupled in series to one another between the sensor input 128 and another voltage terminal, shown as AVSS. However, in other examples, the first voltage sensor circuit 302 may be implemented differently. In some examples, the AVSS can include voltage potential having a lower voltage than AVDD, such as a ground or negative potential. The first voltage sensor circuit 302 is configured to provide a first voltage at the first sensor output 124 based on an input voltage Vin (e.g., the input voltage Vin in FIG. 2) at the first sensor input 128. The first voltage is proportional to the input voltage Vin. For example, the first voltage is Vin/N1, where N1 is a positive value. In the example of FIG. 3, the value of N1 is based on the voltage divider of R1 and R2, that is, N1=(R1+R2)/R2. In one example, N1 is equal to 5. However, other values of N1 can be used in other examples.

The voltage sensor circuit 300 further includes a second voltage sensor circuit 304 including a second sensor input 130 and a second sensor output 126. The second voltage sensor circuit 304 includes a second voltage divider circuit including a combination of resistors R3, R4, R5 and R6, and capacitors C1 and C2. However, in other examples, the second voltage sensor circuit 304 may be implemented differently. The second voltage sensor circuit 304 is configured to provide a second voltage at the second sensor output 126 based on a switching voltage VSW at the second sensor input 130. The second voltage sensor circuit 304 is also coupled to AVSS. The second voltage is proportional to an average switching voltage VSWavg that constitutes an average value of the switching voltage VSW. For example, the second voltage is VSWavg/N2, where N2 is integer positive value. The resistor R5 and the capacitor C1 form a first RC filter stage, and the resistor R6 and the capacitor C2 form a second RC filter stage. In other examples, there can be more than two RC filter stages. The first RC filter stage and the second RC filter stage are configured to generate VSWavg/N2 based on the voltage at the node between the resistors R3 and R4. The average switching voltage VSWavg can approximate or be equal to an output voltage Vout. For example, during the operation of the converter circuit (e.g., the converter circuit 102 in FIGS. 1 and 2), the switching voltage VSW switches between Vin and AVSS (or ground) based on a duty cycle D of the converter circuit, while Vout is also generated based on Vin and the duty cycle D of the converter circuit, such that VSWavg can be equal to Vout. In the example of FIG. 3, the value of N2 is based on the voltage divider of R3 and R4, that is, N2=(R3+R4)/R4. In one example, N2 is equal to 5. Other values of N2 can also be used in other examples. In some examples, the values of the resistors R1, R2, R3 and R4 are chosen so N1=N2. In other examples, different values of N1 and N2 can be used to apply different scaling for Vin and VSW.

Figure 4:
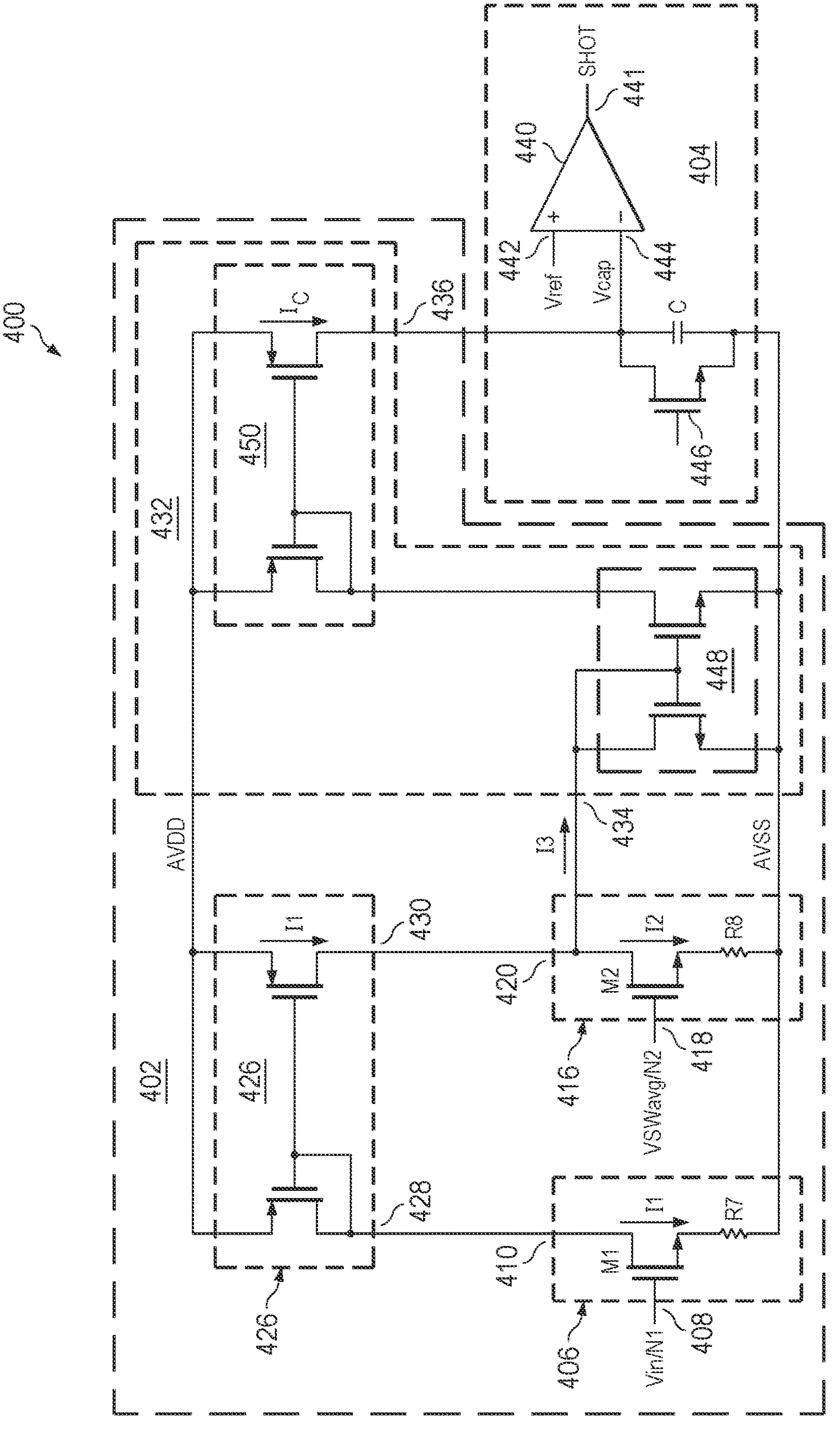
FIG. 4 illustrates an example system that includes a current compensation circuit and a one-shot circuit.

FIG. 4 illustrates an example system 400 that includes a current compensation circuit 402 and a one-shot circuit 404. The current compensation circuit 402 provides a useful example that can be used as the current compensation circuit 116 in FIGS. 1 and 2. The current compensation circuit 402 includes a first voltage-to-current converter 406 including a first voltage input 408 and a first current output 410. The first voltage input 408 corresponds to the first compensation input 118 in FIGS. 1 and 2 and therefore receives the first voltage Vin/N1 (e.g., from first voltage sensor circuit 302). The first voltage to current converter 406 further includes a first compensation switch M1 having a first compensation terminal, a second compensation terminal and a third compensation terminal, in which the first compensation terminal constitutes the first current output 410 and the second compensation terminal constitutes the first voltage input 408. The first voltage to current converter 406 further includes a first compensation resistor R7 coupled between the third compensation terminal of the first compensation switch M1 and another voltage terminal, shown as AVSS. In some examples, the AVSS can include a ground potential or a negative potential.

The first voltage to current converter 406 is configured to provide a first current I1 at the first current output 410 based on the first voltage Vin/N1 at the first voltage input 408. For example, the first current I1 at the first current output 410 can be given as:

$$I1 = \frac{Vin}{N1 * R7} \quad (1)$$

The current compensation circuit 402 further includes a second voltage-to-current converter 416 including a second voltage input 418 and a second current output 420. The second voltage input 418 corresponds to the second compensation input 120 in FIGS. 1 and 2 and therefore receives the second voltage VSWavg/N2 (e.g., from second voltage sensor circuit 304). The second voltage VSWavg/N2 can be equal to Vout/N2, in some examples. The second voltage to current converter 416 includes a second compensation switch M2 including a fourth compensation terminal, a fifth compensation terminal and a sixth compensation terminal, in which the fourth compensation terminal constitutes the second current output 420 and the fifth compensation terminal constitutes the second voltage input 418. The second voltage to current converter 416 further includes a second compensation resistor R8 coupled between the sixth compensation terminal of the second compensation switch M2 and the voltage terminal AVSS.

The second voltage to current converter 416 is configured to provide a second current I2 at the second current output 420 based on the second voltage VSWavg/N2 at the second voltage input 418. For example, the second current I2 can be given as:

$$I2 = \frac{VSWavg}{N2 * R8} \tag{2}$$

The current compensation circuit 402 further includes a first current mirror network 426 having a first current mirror input 428 and a first current mirror output 430, in which the first current mirror input 428 is coupled to the first current output 410. The first current mirror network 426 is configured to mirror the first current I1 at the first current mirror input 428 to provide the first current I1 (or another current proportional to the first current I1) at the first current mirror output 430. The current compensation circuit 402 further includes a second current mirror network 432 including a second current mirror input 434 and a second current mirror output 436, in which the second current mirror input 434 is coupled to second current output 420. The second current mirror output 436 constitutes a compensation output (e.g., the compensation output 117 in FIGS. 1 and 2) of the current compensation circuit 402. The second current mirror network 432 includes a first current mirror 448 and a second current mirror 450 that are coupled to one another. The first current mirror network 426 and the second current mirror network 432 are coupled to a voltage terminal, shown as AVDD. In some example, the voltage terminal AVDD includes a positive voltage terminal, such as can be coupled to an output of a DC voltage source.

The second current mirror input 434 is configured to receive a current I3, which is equal to the difference between I1 and I2. For example, the current at the second current mirror input 434 includes a third current I3 given as:

$$I3 = I1 - I2 \tag{3}$$

Substituting equation (1) and (2) in equation (3) and assuming that N=N1=N2, provides $$I3 = \frac{Vin}{N * R7} - \frac{VSWavg}{N * R8} \tag{4}$$

Considering R7=R8=R, and VSWavg=Vout, equation (3) becomes:

$$I3 = \frac{1}{NR}(Vin - Vout) \tag{5}$$

The second current mirror network 432 is configured to mirror the third current I3 at the second current mirror input 434 to provide a compensated current $I_C$ at the second current mirror output 436. In some examples, the compensated current $I_C$ at the second current mirror output 436 is equal to the third current I3. However, in other examples, the compensated current $I_C$ at the second current mirror output 436 may include a current that is proportional to the third current I3 according to the configuration of the current mirror network 432. The compensated current $I_C$ at the second current mirror output 436 corresponds to the compensated current $I_C$ in FIGS. 1 and 2. The compensated current $I_C$ can be given as:

$$I_C = \frac{1}{NR}(Vin - Vout) \tag{6}$$

The one-shot circuit 404 includes a comparator 440 that includes a first comparator input 442, a second comparator input 444 and a comparator output 441. The first comparator input 442 is configured to receive a reference voltage Vref and the second comparator input 444 is coupled to the compensation output 436. The one-shot circuit 404 further includes a switch 446 coupled between the second comparator input 444 and the ground terminal. In the example of FIG. 4, the switch 446 includes a FET with its gate terminal configured to receive a switching signal (e.g., the switching signal 115 in FIGS. 1 and 2). The one-shot circuit 404 further includes a capacitor C which is configured to provide a capacitor voltage Vcap based on the compensated current $I_C$ at the second current mirror output 436. The one-shot circuit 404 functions similarly to and provides a useful example that can be implemented as the one-shot circuit 132 in FIGS. 1 and 2.

Referring back to FIG. 2, the one-shot circuit 132 (e.g., circuit 404) is configured to control/adjust an on-time Ton of a high-side switch 202 via the shot signal SHOT provided at 114. In particular, the one-shot circuit 132 is configured to control the turning off of the high-side switch 202 based on the shot signal SHOT at 114. The on-time Ton of the high-side switch 202 corresponds to a continuous time period during which the high-side switch 202 is turned on. In order to facilitate the one-shot circuit 132 to adjust the on-time Ton of the high-side switch 202, when the high-side switch 202 is turned on, the switch 142 of the one-shot circuit 132 is turned off. Conversely, when the high-side switch 202 is turned off, the switch 142 of the one-shot circuit 132 is turned on. The turning on and turning off of the switch 142 may be controlled by providing a switching signal 115. In some examples, the switching signal 115 includes an inverted version of the high-side driving signal of the high-side switch 202. However, in other examples, the switching signal 115 may be implemented differently, such as the low-side driving signal at 112.

Figure 5:
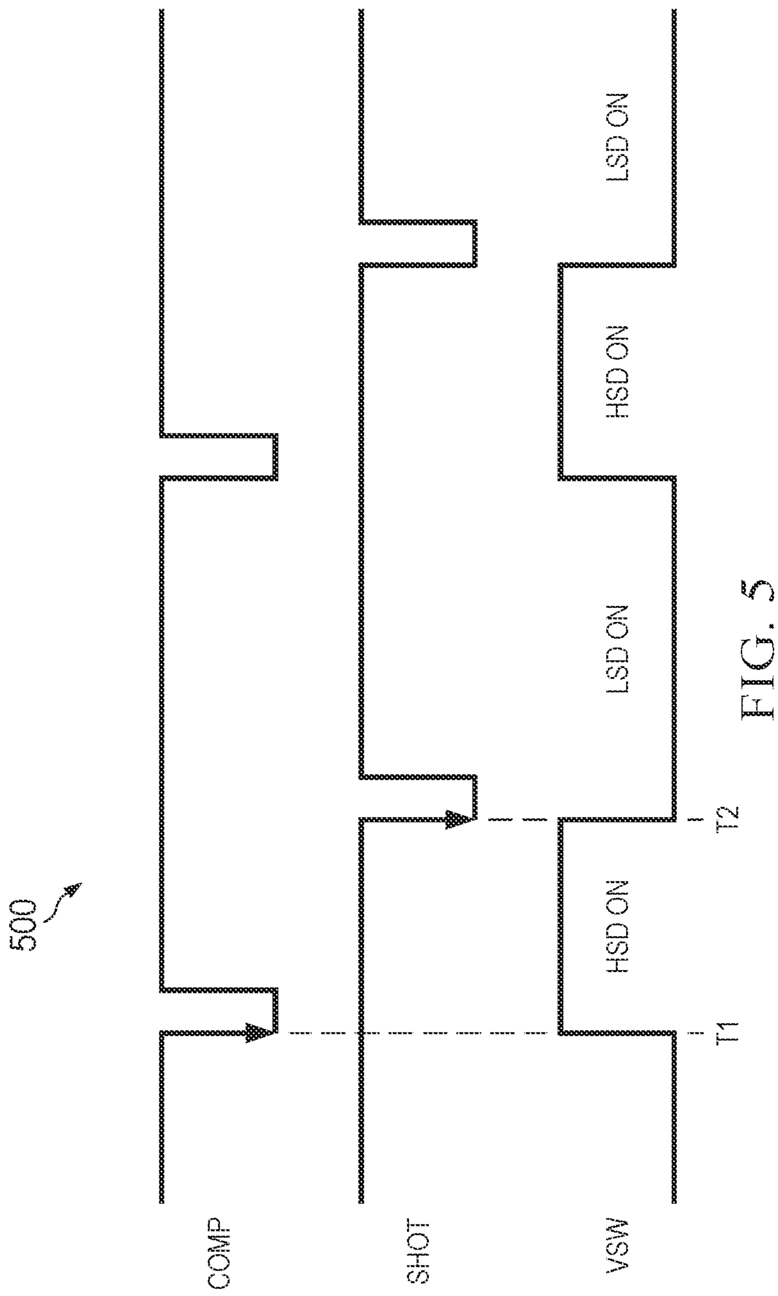
FIG. 5 is a signal diagram that depicts the comparator output signal, the shot signal and a switching voltage of FIG. 2, for example.

The logic circuit 238 is configured to control turning on of the high-side switch 202 based on the comparator output signal COMP and the SHOT signal. For example, when the feedback voltage VFB at the first voltage comparator input 230 becomes lesser than the output voltage reference REF at the second voltage comparator input 232, the comparator output signal COMP goes low, thereby turning on the high-side switch 202. To better understand the turning on and the turning off of the high-side switch 202, FIG. 5 illustrates a signal diagram 500 that depicts the comparator output signal COMP, the shot signal SHOT and the switching voltage VSW of FIG. 2. As can be seen in FIG. 5, when the comparator output signal COMP goes low at T1, the switching voltage VSW goes high, which in turn indicates that the high-side switch 202 is turned on.

Referring back to FIG. 2, when the high-side switch 202 is turned on, the switch 142 of the one-shot circuit 132 is turned off, thereby charging the capacitor 144, based on the compensated current $I_C$. When the voltage Vcap across the capacitor 144 becomes equal to or greater than Vref, the comparator signal changes states (i.e., the shot signal SHOT goes low), thereby turning off the high-side switch 202. Referring to FIG. 5, when the shot signal SHOT goes low at T2, the switching voltage VSW goes low, which in turn indicates that the high-side switch 202 is turned off. Referring back to FIG. 2, when the high-side switch 202 is turned off, the switch 142 of the one-shot circuit 132 turns on, thereby discharging the capacitor 144. Once the high-side switch 202 is turned off, the capacitor 144 waits to be charged until the next time the high-side switch 202 is turned on.

Therefore, based on the example arrangement shown in FIG. 2, the compensated current $I_C$ charges the capacitor 144 to a voltage Vref (e.g., from 0V) during the on-time Ton (e.g., the time period T2-T1 in FIG. 5) of the high-side switch 202. For example, the on-time Ton of the high-side switch 202 can be derived as follows:

$$I_C = C\frac{dv}{dt} \tag{7}$$

where: $I_C$=the compensated current;

C=the capacitance value of the capacitor 144;

dt=Ton; and dv=Vref−0=Vref (that is, the change in capacitor voltage during Ton)

Substituting the above values in equation (7), the current value becomes:

$$I_C = C\frac{Vref}{\text{Ton}} \tag{8}$$

Further substituting equation (6) in equation (8), the value of the on-time Ton can be represented as follows:

$$\frac{1}{NR}(Vin - Vout) = C\frac{Vref}{\text{Ton}} \tag{9}$$

Therefore, $$\text{Ton} = \frac{N * R * C * Vref}{(Vin - Vout)} \tag{10}$$

As described herein, controlling the on-time Ton of the high-side switch 202 based on the shot signal SHOT enables the circuit 100 to have a constant inductor ripple current across the inductor 216 of the converter circuit 102. In particular, controlling the on-time Ton of the high-side switch 202 based on the shot signal SHOT enables a current through the inductor 216 to have a constant inductor ripple current. For example, voltage across the inductor 216 is given as:

$$V_L = L\frac{dI_L}{dt} \tag{11}$$

During the on-time Ton of the high-side switch 202, $dI_L$=Ipp which is the inductor ripple current, dt=Ton and $V_L$=Vin−Vout (as the switching voltage VSW becomes equal to Vin when the high-side switch 202 is turned on).

Substituting the above values in equation (11), the equation for inductor ripple current (through the inductor 216) can be expressed as follows:

$$Ipp = \frac{(Vin - Vout)}{L} * \text{Ton} \tag{12}$$

Where Ipp is a peak to peak inductor ripple current.

Substituting for Ton based on equation (10), the inductor ripple current Ipp can be expressed as follows:

$$Ipp = \frac{N * R * C * Vref}{L} \tag{13}$$

Thus, as can be seen from equation (13), inductor ripple current Ipp depends on all constant factors, which can result in a constant inductor ripple current Ipp across the inductor 216. Advantageously, the inductor ripple current Ipp is independent of the output voltage Vout, and therefore, the inductor ripple current is constant irrespective of the value of the output voltage Vout.

As a result, the current compensation circuit 116 and the one-shot circuit 132 as described herein can be utilized to implement power converter modules (e.g., DC-DC converter SOC modules) over a wide range of output voltages without affecting the inductor ripple current. For example, in power converter modules with a fixed integrated inductor (e.g., inductor 216), both high and low values of output voltage Vout can be supported without a change in the inductor ripple current. Further, this approach enables the use of smaller inductors to achieve a certain voltage level in power converter modules, thereby reducing the overall size and cost of the power converter modules.

In this description, the term "based on" means based at least in part on.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device described herein as including certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure, either at a time of manufacture or after a time of manufacture, such as by an end user and/or a third party.

Modifications are possible in the described embodiments, and other embodiments are possible, within the scope of the claims.

What is claimed is:

1. A circuit, comprising:
a current compensation circuit having first and second compensation inputs, and a compensation output, in which the first compensation input is coupled to an input voltage terminal and the second compensation input is coupled to a switching terminal; and
a one-shot circuit including:
a comparator having first and second comparator inputs, and a comparator output, in which the first comparator input is coupled to a voltage reference terminal and the second comparator input is coupled to the compensation output;
a switch coupled between the second comparator input and a ground terminal; and
a capacitor having first and second capacitor terminals, in which the first capacitor terminal is coupled to the second comparator input and the second capacitor terminal is coupled to the ground terminal.

2. The circuit of claim 1, further comprising a converter circuit including:
a high-side switch having first and second high-side terminals, in which the first high-side terminal is coupled to the input voltage terminal and the second high-side terminal is coupled to the switching terminal; and
a low-side switch having first and second low-side terminals, in which the first low-side terminal is coupled to the switching terminal and the second low-side terminal is coupled to the ground terminal.

3. The circuit of claim 2, wherein the current compensation circuit includes:
a first voltage-to-current converter including a first voltage input and a first current output, wherein the first voltage input constitutes the first compensation input;
a first current mirror network having a first current mirror input and a first current mirror output, in which the first current mirror input is coupled to the first current output;
a second voltage-to-current converter having a second voltage input and a second current output, wherein the second voltage input constitutes the second compensation input; and
a second current mirror network having a second current mirror input and a second current mirror output, in which the second current mirror input is coupled to second current output and wherein the second current mirror output constitutes the compensation output.

4. The circuit of claim 3, wherein:
the first voltage to current converter is configured to provide a first current at the first current output based on a first voltage at the first voltage input,
the second voltage to current converter is configured to provide a second current at the second current output based on a second voltage at the second voltage input,
the first current mirror network is configured to mirror the first current at the first current mirror input to provide the first current at the first current mirror output, and
the second current mirror network is configured to provide a compensated current at the second current mirror output based on a difference between the first current and the second current at the second current mirror input.

5. The circuit of claim 4, wherein:
the capacitor of the one-shot-circuit is configured to provide a capacitor voltage at the first capacitor terminal based on the compensated current, and
the comparator of the one-shot circuit is configured to provide a comparator signal based on the capacitor voltage and a reference voltage at the voltage reference terminal, to adjust an on-time of the high-side switch of the converter circuit.

6. The circuit of claim 4, wherein:
the first voltage is proportional to an input voltage at the input voltage terminal, and
the second voltage is proportional to an average value of a switching voltage at the switching terminal.

7. The circuit of claim 3, wherein
the first voltage to current converter comprises:
a first compensation switch having first, second and third compensation terminals, in which the first compensation terminal constitutes the first current output and second compensation terminal constitutes the first voltage input; and
a first compensation resistor having first and second resistor terminals, in which the first resistor terminal is coupled to the third compensation terminal and the second resistor terminal is coupled to the ground terminal; and
the second voltage to current converter comprises:
a second compensation switch having fourth, fifth and sixth compensation terminals, in which the fourth compensation terminal constitutes the second current output and the fifth compensation terminal constitutes the second voltage input; and
a second compensation resistor having third and fourth resistor terminals, in which the third resistor terminal is coupled to the sixth compensation terminal and the fourth resistor terminal is coupled to the ground terminal.

8. The circuit of claim 2, wherein the converter circuit further comprises an inductor coupled between the switching terminal and an output terminal in which current through the inductor has a constant inductor ripple current.

9. The circuit of claim 8, wherein the circuit is a system-on-chip device in a packaging material.

10. The circuit of claim 1, further comprising a voltage sensor circuit including:
a first sensor circuit having a first sensor input and a first sensor output, in which the first sensor input is coupled to the input voltage terminal and the first sensor output is coupled to the first compensation input; and
a second sensor circuit having a second sensor input and a second sensor output, in which the second sensor input is coupled to the switching terminal and the second sensor output is coupled to the second compensation input.

11. The circuit of claim 10, wherein
the first sensor circuit is a first voltage divider circuit configured to provide a first voltage at the first sensor output that is proportional to an input voltage at the input voltage terminal; and
the second sensor circuit is a second voltage divider circuit configured to provide a second voltage at the second sensor output that is proportional to an average switching voltage that constitutes an average value of a switching voltage at the switching terminal.

12. The circuit of claim 1, further comprising:

a converter control circuit including:

a voltage comparator including first and second voltage comparator inputs, and a voltage comparator output, in which the first voltage comparator input is coupled to an output terminal and the second voltage comparator input is coupled to an output voltage reference terminal; and a logic circuit having first and second logic inputs, and first and second logic outputs, in which the first logic input is coupled to the voltage comparator output and the second logic input is coupled to the comparator output of the one-shot circuit.

13. A circuit comprising:

a current compensation circuit configured to provide a compensated current based on a first voltage and a second voltage, wherein the first voltage is proportional to an input voltage and the second voltage is proportional to an average value of a switching voltage; and a one-shot circuit including:

a capacitor configured to provide a capacitor voltage based on the compensated current;

a comparator configured to provide a comparator signal based on the capacitor voltage and a reference voltage; and a switch configured to discharge the capacitor.

14. The circuit of claim 13, further comprising:

a converter circuit configured to provide the switching voltage at a switching terminal between a high-side switch and a low-side switch of based on the input voltage;

wherein an on-time of the high-side switch is adjusted based on the comparator signal, the converter circuit further including an inductor coupled between the switching terminal and an output terminal, and the circuit is a system-on-chip device in a packaging material.

15. The circuit of claim 14, further comprising:

a first voltage divider circuit configured to provide the first voltage based on the input voltage; and a second voltage divider circuit configured to provide the second voltage based on the switching voltage.

16. The circuit of claim 13, wherein the current compensation circuit comprises:

a first voltage to current converter configured to provide a first current based on the first voltage;

a second voltage to current converter configured to provide a second current based on the second voltage; and a current mirror network configured to provide the compensated current that is a difference between the first current and the second current.

17. A system comprising:

a converter circuit including:

a high-side switch having first and second high-side terminals, in which the first high-side terminal is coupled to an input voltage terminal and the second high-side terminal is coupled to a switching terminal;

a low-side switch having first and second low-side terminals, in which the first low-side terminal is coupled to the switching terminal and the second low-side terminal is coupled to a ground terminal; and an inductor having first and second inductor terminals, in which the first inductor terminal is coupled to the switching terminal and the second inductor terminal is coupled to an output terminal;

a current compensation circuit having first and second compensation inputs, and a compensation output, in which the first compensation input is coupled to the input voltage terminal and the second compensation input is coupled to the switching terminal; and a one-shot circuit including:

a comparator having first and second comparator inputs, and a comparator output, in which the first comparator input is coupled to a voltage reference terminal and the second comparator input is coupled to the compensation output;

a switch coupled between the second comparator input and the ground terminal; and a capacitor having first and second capacitor terminals, in which the first capacitor terminal is coupled to the second comparator input and the second capacitor terminal is coupled to the ground terminal.

18. The system of claim 17, wherein the current compensation circuit comprises:

a first voltage to current converter having a first voltage input and a first current output, in which the first voltage input is coupled to the input voltage terminal and wherein the first voltage input constitutes the first compensation input;

a first current mirror network having a first current mirror input and a first current mirror output, in which the first current mirror input is coupled to the first current output;

a second voltage to current converter having a second voltage input and a second current output, in which the second voltage input is coupled to the switching terminal and wherein the second voltage input constitutes the second compensation input; and a second current mirror network having a second current mirror input and a second current mirror output, in which the second current mirror input is coupled to second current output and wherein the second current mirror output constitutes the compensation output.

19. The system of claim 18, wherein the first voltage to current converter is configured to provide a first current at the first current output based on a first voltage at the first voltage input, wherein the first voltage is proportional to an input voltage at the input voltage terminal;

the second voltage to current converter is configured to provide a second current at the second current output based on an average switching voltage at the second voltage input, wherein the average switching voltage is proportional to an average value of a voltage at the switching terminal;

the first current mirror network is configured to mirror the first current at the first current mirror input to provide the first current at the first current mirror output; and the second current mirror network is configured to provide a compensated current at the second current mirror output based on a difference between the first current and the second current at the second current mirror input.

20. The system of claim 19, wherein the capacitor of the one-shot-circuit is configured to provide a capacitor voltage at the first capacitor terminal based on the compensated current; and the comparator of the one-shot circuit is configured to provide a comparator signal based on the capacitor voltage and a reference voltage at the voltage reference terminal, to adjust an on-time of the high-side switch of the converter circuit.

21. The system of claim 17, wherein the system is a system-on-chip device in a packaging material.

22. The system of claim 17, further comprising an output capacitor coupled to the output terminal.

* * * * *